(No Model.) 2 Sheets—Sheet 1.
G. C. SMITH.
CONDUCTING PIPE.
No. 400,262. Patented Mar. 26, 1889.
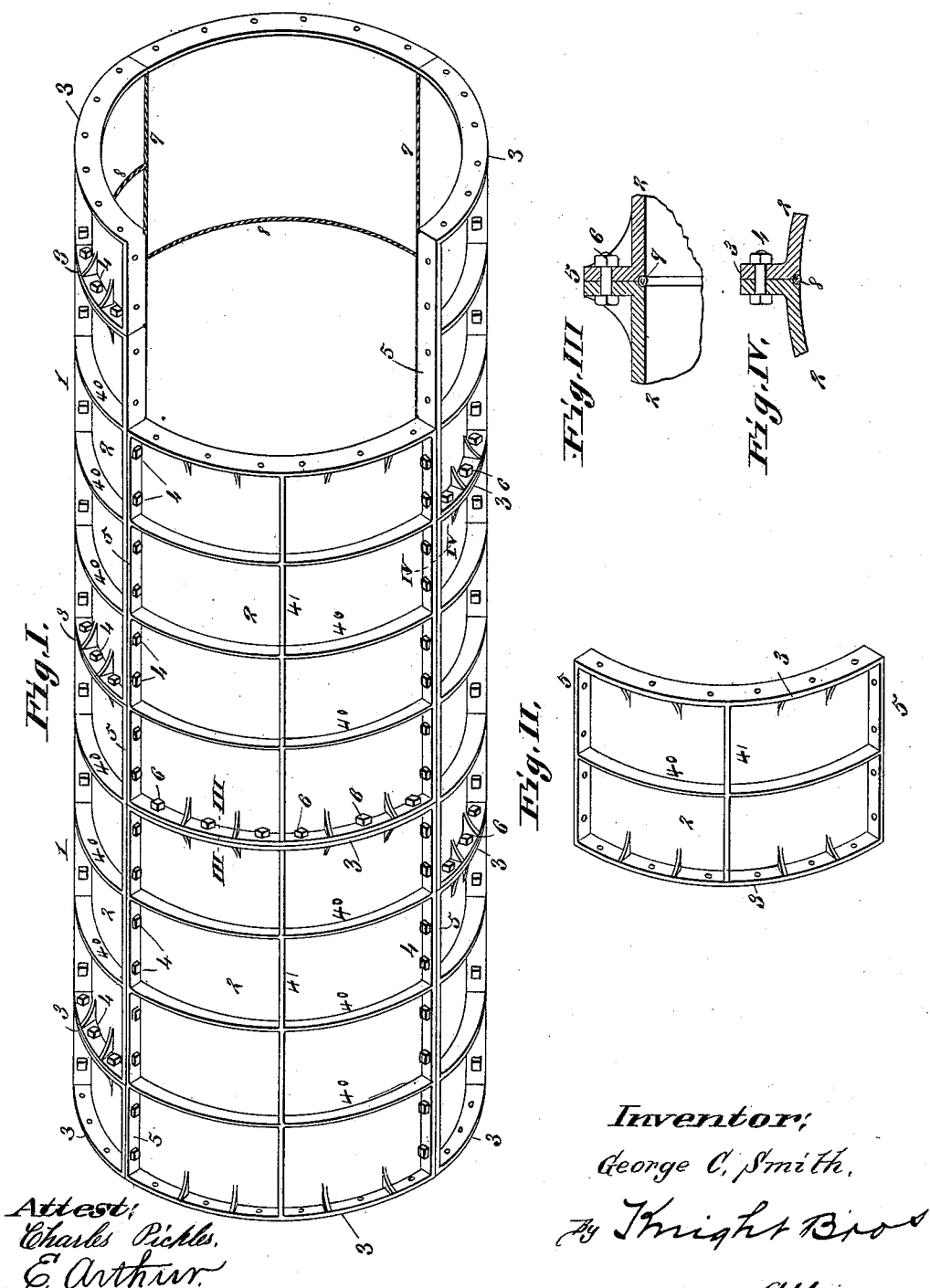
Attest:
Charles Pickles.
E. Arthur.
Inventor:
George C. Smith.
By Knight Bros
Atty's

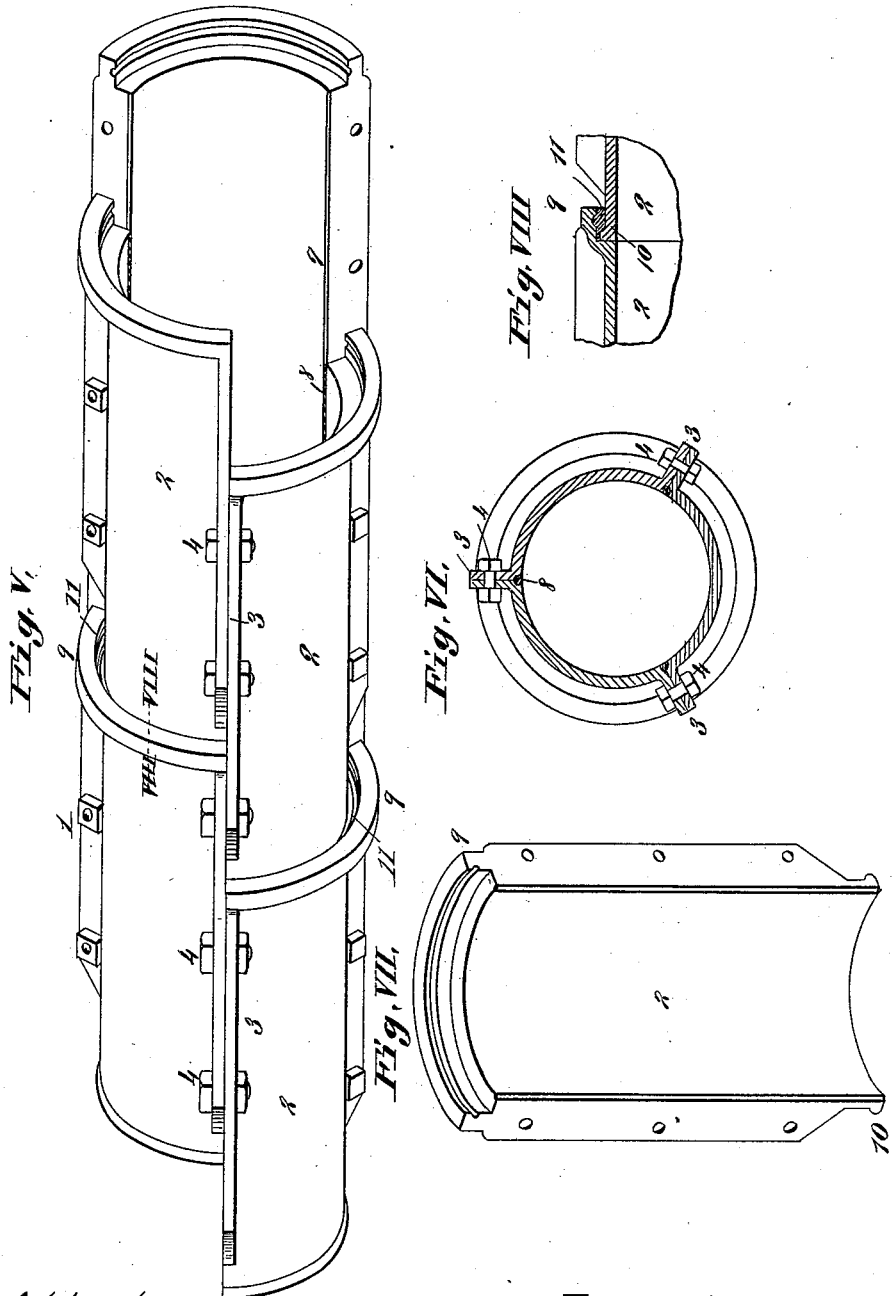

UNITED STATES PATENT OFFICE.

GEORGE C. SMITH, OF CHICAGO, ILLINOIS.

CONDUCTING-PIPE.

SPECIFICATION forming part of Letters Patent No. 400,262, dated March 26, 1889.

Application filed May 22, 1888. Serial No. 274,684. (No model.)

*To all whom it may concern:*

Be it known that I, GEORGE C. SMITH, of Chicago, in the county of Cook and State of Illinois, have invented a certain new and useful Improvement in Conducting-Pipes, of which the following is a full, clear, and exact description, reference being had to the accompanying drawings, forming part of this specification, and in which—

Figure I is a perspective view of part of a pipe constructed according to my improvement. Fig. II is a perspective view of one of the sections. Fig. III is a detail transverse section taken on line III III, Fig. I. Fig. IV is a detail transverse section taken on line IV IV, Fig. I. Fig. V is a perspective view showing the invention applied to a bell-and-spigot form of pipe. Fig. VI is a transverse section of the form of pipe shown in Fig. V. Fig. VII is a perspective view of a section of the pipe shown in Fig. V, and Fig. VIII is a section taken on line VIII VIII, Fig. V.

My invention relates to an improvement in pipes which may be used for conducting water, gas, sewage, and the like; and my invention consists in features of novelty, as hereinafter described, and pointed out in the claims.

Referring to the drawings, 1 represents a portion of a pipe constructed according to my invention, and 2 the sections composing the pipe. The sections are preferably provided with flanges 3, through which pass connecting-bolts 4 to secure the sections together longitudinally.

5 represents flanges on the sections, through which rivets or bolts 6 are passed to connect the sections transversely.

The sections may be made of different lengths, and they are preferably placed so that the transverse joint between two sections does not come opposite the transverse joint of the adjoining sections; or, in other words, the sections are preferably placed together in such a manner as to break joints with the adjoining sections. This adds to the strength of the pipe when made up or put together. Grooves 7 are preferably made between the adjoining faces of the sections to receive a packing, 8, which is placed between them to avoid danger of leakage.

40 represents ribs surrounding the pipe and which serve to strengthen it transversely to avoid danger of crushing. These ribs are so disposed that those of different sections will form continuous ribs around the pipe, whether the sections be placed to break joints or not.

41 represents ribs running longitudinally of the pipe for the purpose of insuring equal shrinkage.

The invention may be applied in the construction of a plain pipe, as shown in Figs. I to IV, inclusive, or it may be applied to what is known as a "bell-and-spigot pipe," as shown in Figs. V to VIII, inclusive, 9 representing the bell of the pipe, and 10 the spigot. In this form of construction a packing may be placed between the bell and spigot, as shown at 11, Fig. V, if desired. Pipes thus made in sections may be shipped in "knockdown" form to their destination, or where they are to be used, thus consuming much less space than ordinary pipes, and they can also be put in place section at a time, thus requiring much less labor and often dispensing with the use of machinery in holding them, as has been necessary heretofore with heavy pipes not made in sections. It frequently happens, particularly in the construction of railways, that pipes have to be used in country places, or a long distance from machines for handling them, and my invention dispenses with the necessity of taking machinery to the place where they are to be used, as they can be handled section at a time and put together in place of use.

The term "longitudinal sections" used in the claims is intended to distinguish sections extending lengthwise of the pipe in contradistinction to transverse sections, or the ordinary form of pipes.

I claim as my invention—

1. A conducting-pipe composed of sections, each having joining flanges and ribs, the distance from rib to flange and rib to rib being equal in all the sections, whereby the sections may be put together in break-joint style and the flange of one section be caused to coincide with a rib of the contiguous section, substantially as set forth.

2. A pipe composed of sections or segments having transverse joining flanges and ribs, such sections being put together in lap or break-joint style with their ribs and flanges meeting or coinciding throughout the circumference of the pipe, and the distance between the transverse flanges of some of said sections being different from the distance between such flanges of the other sections, whereby the ends of the pipe may be finished evenly, substantially as set forth.

GEORGE C. SMITH.

In presence of—
W. D. EATON,
C. A. KIMMIT.